US005968632A

United States Patent [19]

Oshima et al.

[11] Patent Number: 5,968,632

[45] Date of Patent: Oct. 19, 1999

[54] CAVITY INCLUDED DECORATIVE SHEET, ITS MANUFACTURING METHOD AND MANUFACTURING APPARATUS

[75] Inventors: Masahiro Oshima; Hiroshi Sasaki, both of Osaka, Japan

[73] Assignee: Meiwa Gravure Co., Ltd., Osaka, Japan

[21] Appl. No.: 08/988,220

[22] Filed: Dec. 10, 1997

[30] Foreign Application Priority Data

May 23, 1997 [JP] Japan .................................... 9-134042

[51] Int. Cl.$^{6}$ ........................................................ B32B 3/00

[52] U.S. Cl. .......................... 428/161; 428/162; 428/166; 428/172; 428/177; 428/187

[58] Field of Search ..................................... 428/173, 172, 428/161, 157, 162, 166, 187, 188

[56] References Cited

U.S. PATENT DOCUMENTS

| | | | |
|---|---|---|---|
| 2,668,328 | 2/1954 | Porter | 18/58 |
| 3,706,825 | 12/1972 | Hall et al. | 264/75 |
| 3,981,951 | 9/1976 | Richman | 264/140 |
| 4,680,155 | 7/1987 | Rochefort et al. | 264/73 |

*Primary Examiner*—Merrick Dixon
*Attorney, Agent, or Firm*—Kubovcik & Kubovcik

[57] ABSTRACT

There is provided a cavity included decorative sheet having tremendously excellent design and decorative features by the cavities formed in the plane region in which colorless or colored light transmissible uneven pattern formed as the light refracts and reflects in complicated manner, by which the cavities appear to be brilliant water bubbles.

12 Claims, 9 Drawing Sheets

CAVITY INCLUDED DECORATIVE SHEET, ITS MANUFACTURING METHOD AND MANUFACTURING APPARATUS

BACKGROUND OF THE INVENTION

The present invention relates to a decorative sheet such as table cloth, bath room curtain, window lining sheet, material cloth for bags and the like, its manufacturing method and manufacturing apparatus.

Conventional synthetic resin decorative sheet is supplied with improved design characteristics by printing patterns on the obverse or reverse side of a synthetic resin sheet or providing uneven surface by embossing. Also, the bottom dye printing and top dye printing using the embossing roll are known.

However, the decorative sheets made by simply printing patterns are flat in patterns and poor in design features. Uneven patterns formed by embossing work or uneven patterns provided by using an embossing roll have a drawback of being shallow in depth and liable to be extinguished.

In view of the above, the present inventors proposed a method for producing a glass tone lustrous sheet having precise uneven patterns which are less liable to be extinguished, by Japanese Patent No. 1669906. According to said method, a long length base sheet coated on one side with a transparent paste form resin is pressed by thrusting through the cavity between the metal cylinder provided with a heating device for gelating the paste form resin and a pressing roll, and uneven patterns are formed by means of the concave impressing patterns formed on any of the cylinder and the pressing roll.

However, in recent years general demands for the more design-rich gorgeous decorative sheet are increased.

BRIEF SUMMARY OF THE INVENTION

The present invention has been devised to solve the above problems. An object of the present invention is to provide a cavity included decorative sheet having increased gorgeous appearance and excellent design and decorative characters by laying the pattern of fine cavities in addition to an uneven pattern, its manufacturing method and manufacturing apparatus.

A cavity included decorative sheet according to the present invention is characterized in that a colorless or colored translucent first uneven pattern is formed, and cavities are formed in the plane region in which said first uneven pattern is formed. By means of the fine cavities formed in the first translucent uneven pattern, light refracts and reflects in complicated manner, and the hollow areas appear like water bubbles, and the pattern shows tremendously excellent design and decorative features. Also, by being combined with the first uneven pattern formed by convex and concave parts, a complicated and stereographic pattern is formed.

In addition, in case a translucent second uneven pattern is formed in a plane region in which the first uneven pattern is formed, a more complicated and stereographic pattern is obtained.

The first uneven pattern and the second uneven pattern may be formed in different colors. The first uneven pattern and the second uneven pattern may be either one colorless and one colored, or both colored. By this a more gorgeous impression can be provided.

A plane region in which at least said hollow is formed may be colored with a color different from that of the first pattern. In such a case, due to the coloration of the region having hollow parts which shine on complicated refraction and reflection of light, brilliant impression is given to provide further excellent design and decorative features.

In case either face of the cavity included decorative sheet is processed into nearly flat condition and transparent adhesive applied, the sheet can be used for example, a sheet for window or other label sheet. It is possible to apply the sheet to an object to be decorated in a room, and the like to decorate it gorgeously.

In case a color printed sheet is labeled on either surface of the cavity included decorative sheet, by combining with the pattern or color by printing, more excellent design and decorative effect are obtainable.

A method for manufacturing a cavity included decorative sheet according to the present invention comprises the steps of: filling a first paste form synthetic resin in a first impressing body at whose surface a first uneven pattern is formed with concave parts, and at the bottom of the concave part projections being formed, and transferring the first paste form resin having the first uneven pattern in which the cavities proportionate to said projections are formed to a base sheet by bringing the base sheet into contact with the first impressing body in which the first paste form resin is filled. Accordingly, by the small cavities formed in the light transmissible first uneven pattern, the light refracts and reflects in complicated manner, by which the cavities appear to be brilliant water bubbles, and by the combination of the cavities with the first uneven pattern formed by the uneven parts, there can be obtained the cavity included decorative sheet having complicated and stereographic pattern which shows extremely excellent design and decorative properties.

The present method further includes the steps of applying a second paste form resin to the base sheet, and forming a second uneven pattern by pressing to a second impressing body in which the second uneven pattern is formed with concave portions. In the above transfer step, the base sheet on which the second uneven pattern is formed may be used. As these steps allow to form two kinds of uneven patterns, there can be obtained a cavity included decorative sheet having more complicated and stereographic pattern.

Further, after the transfer step, the step of coating a colored third paste form resin may be included so as to close said cavity. In this case, by combining with the pattern or color by the third paste form resin, there can be obtained a hollow-containing decorative sheet having excellent design and decorative features.

An apparatus for manufacturing a cavity included decorative sheet according to the present invention comprises: a first impressing body having a first uneven pattern formed with concave parts thereon and having projections formed at the bottom of said concave part, means for filling a first paste form resin in the first impressing body, and a transfer means for transferring the first paste form resin having the first uneven pattern and cavities corresponding to said projections to a base sheet, by bringing the base sheet into contact with the first impressing body in which the first paste form resin is filled. By this, there can be obtained the decorative sheet having complicated and stereographic pattern which shows extremely excellent design and decorative properties. The size, shape, number and forming position of the projection to be provided on the first impressing body for forming the cavities may be optionally changed according to the desired pattern.

The apparatus further includes means for applying a second paste form resin to the base sheet, a second impressing body for forming a second uneven pattern with concave portions, and means for forming the second uneven pattern by pressing to the second impressing body the base sheet to which the second paste form resin is applied. A base sheet on which the second uneven pattern is formed may be used with the transfer means. By this method two kinds of uneven patterns can be formed, and there can be obtained a hollow-containing decorative sheet having more complicated stereographic design.

Further, the apparatus may be equipped with means for applying a colored third paste form resin so as to close the above cavities. By thus combining with the pattern or color by the third paste form resin, a cavity containing decorative sheet having more excellent design and decorative features can be obtained.

Furthermore, there may be provided means for labeling other sheet so as to block said cavities. In case of using other sheet as a viscous sheet, such a sheet may be the window labeling sheet or other labeling sheet so that it is possible to apply it easily to the interior objects to decorate them gorgeously. Constitution may be such that other sheet on which the third paste form resin is applied is labeled to block the cavities.

The above and further objects and features of the invention will more fully be apparent from the following detailed description with accompanying drawings.

DETAILED DESCRIPTION OF THE INVENTION

Hereinafter, the present invention is described in detail with reference to the drawings which show the embodiments thereof.

Embodiment 1

Figure 1:
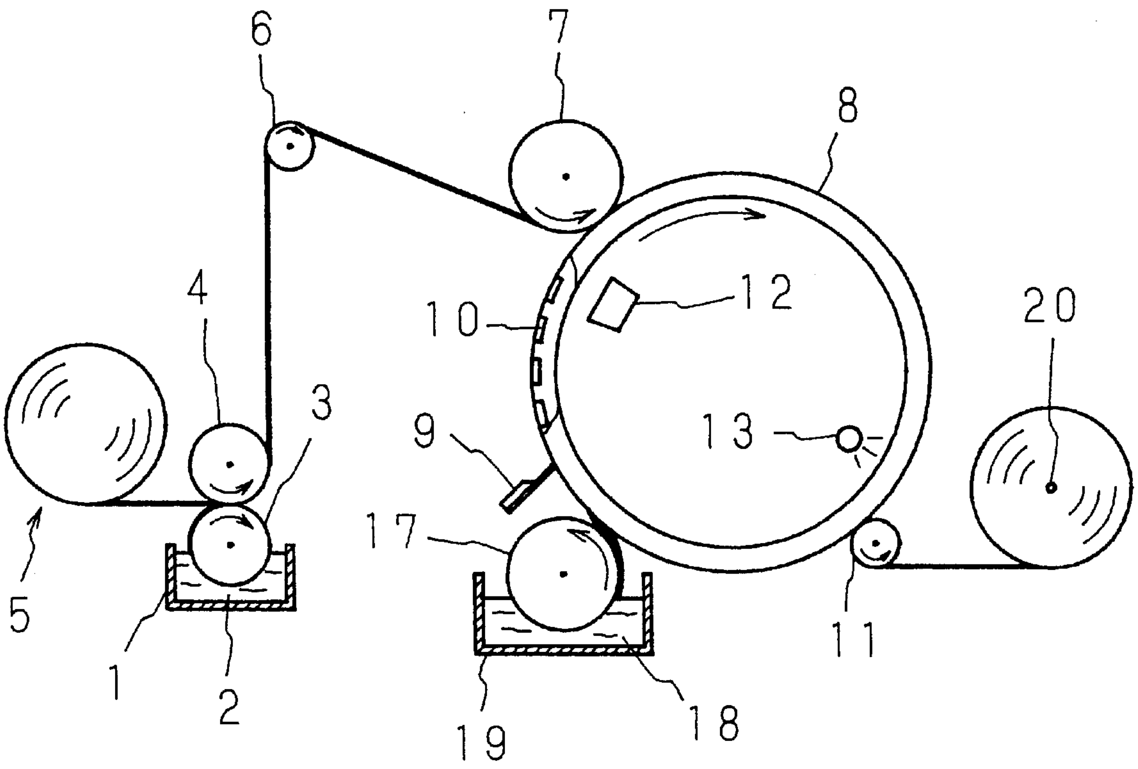
FIG. 1 is a schematic view showing an apparatus for manufacturing a cavity included decorative sheet according to Embodiments 1 and 2.

FIG. 1 is a schematic view showing an apparatus for manufacturing a cavity included decorative sheet according to Embodiment 1. In the figure, numeral 5 denotes a device for drawing out a long length sheet which is a base sheet. On the right lateral side of the drawing device 5 a receiving roll 4 and a coating roll 3 are disposed in upper and lower positions. Below the coating roll 3, there is a storage tank 1 for storing a second paste-like resin 2. The coating roll 3 is disposed in a manner that its lower half part is dipped in the paste form resin 2. On the right above part of the receiving roll 4 a guide roll 6 is provided, and further on the right side thereof there is a rubber made pressure roll 7 in which a predetermined pattern (second uneven pattern) is engraved in concave form.

Figure 2:
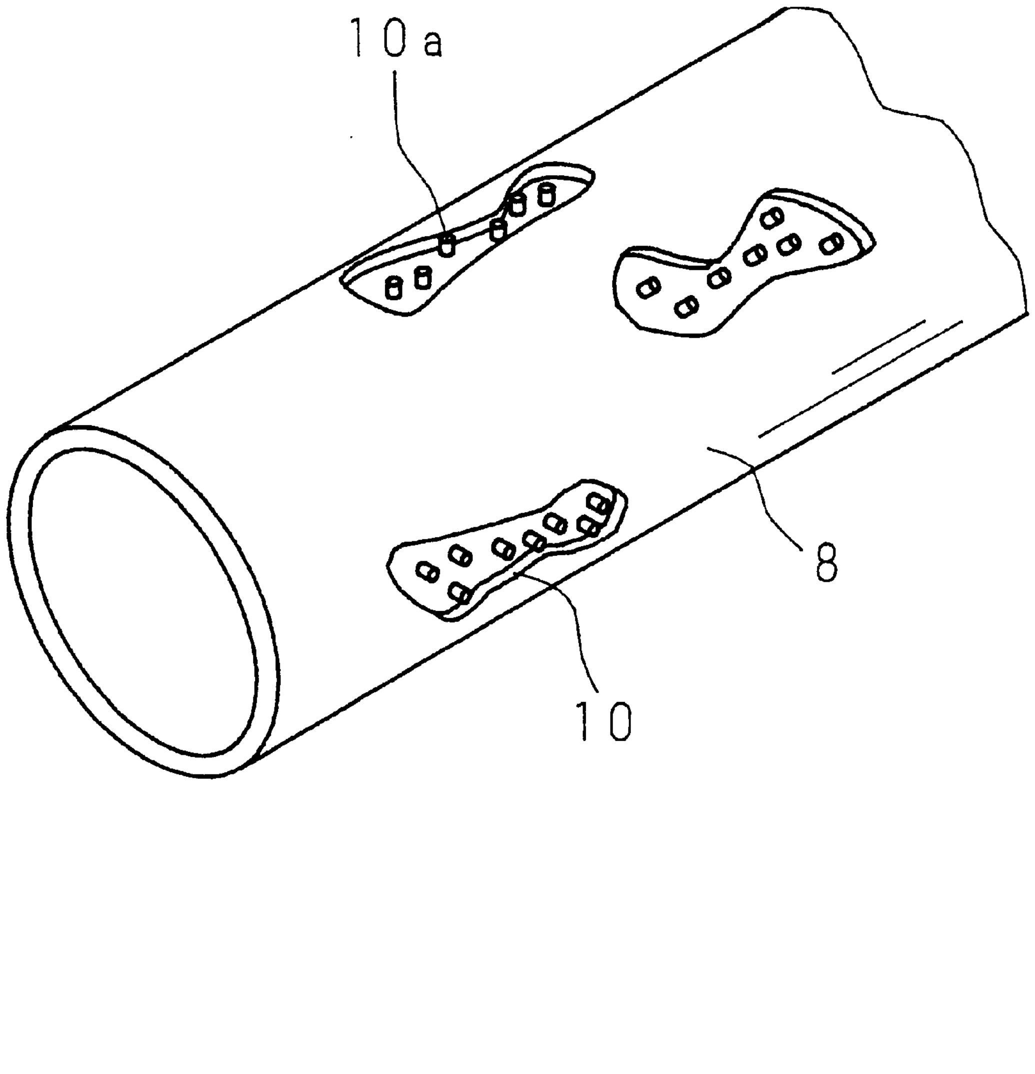
FIG. 2 is an enlarged perspective view of a metal cylinder shown in FIG. 1.

Right below the pressure roll 7, there is a metal made cylinder 8 disposed in nearly contact with the pressure roll 7. On the outer surface of the metal cylinder 8 there are engraved a large number of concave parts 10 having predetermined patterns (first uneven pattern), and in the concave engraving part 10 there are formed a large number of fine approximately pillar form projections 10*a* (FIG. 2). Left below the metal cylinder 8, a coating roll 17 is disposed nearly, and its lower half part can be dipped in a first paste form resin 18 in a storage tank 19. Above the coating roll 17 there is a doctor impressing body 9 for scraping off the paste form resin 18 which is superfluously deposited on the metal cylinder 8.

Right downward the metal cylinder 8 there is a releasing roll 11 for releasing the sheet from the metal cylinder 8. Inside the metal cylinder 8, on the upstream side from the releasing roll 11 in its direction of rotation, there is a cooler 13 for blowing the cooling water toward the inside of the metal cylinder 8. Likewise, in the metal cylinder 8, between the doctor impressing body 9 and the pressure roll 7, there is a heater 12 for heating the inside of the metal cylinder 8. A taking up shaft 20 is provided at a moderate distance from the releasing roll 11.

Next, a method for manufacturing a cavity included decorative sheet using the apparatus constituted as above is explained.

On the drawing device 5, the long length sheet made of a synthetic resin having elasticity and light transmissibility is set under the condition of being wound in a roll form. The storage tank 1 is filled with the second paste form resin 2, and the storage tank 19 is filled with the first paste form resin 18. The second paste form resin 2 and the first paste form resin 18 may be of the same mixing and color arrangement or different mixing and color arrangement.

Firstly, the drawn out long length sheet from the drawing device 5 is let through the cavity between the receiving roll 4 and the coating roll 3, and the paste form resin 2 is coated uniformly on one side of the long length sheet through the coating roll 3. The long length sheet is transferred to the spot between the pressure roll 7 and the metal cylinder 8 via the guide roll 6.

On rotation of the metal cylinder 8, the paste form resin 18 is sequentially filled in the concave engraved parts 10 of the metal cylinder 8 through the coating roll 17, and extra paste form resin 18 is scraped off with the doctor impressing body 9. Subsequently, the paste form resin 18 is heated by the heater 12 to about 180–200° C., gelled and then attached to the long length sheet transferred to the cavity between the pressure roll 7 and the metal cylinder 8. At this time, on the long length sheet to which the paste form resin 2 is applied a predetermined pattern is formed under pressure of the pressure roll 7 on the surface of which a concave engraved pattern is formed.

Further, while the metal cylinder 8 rotates, the paste form resin 18 in the concave engraved part 10 and the paste form resin 2 are completely fixed together, and cooled by the cooler 13 to become solidified. As a result, the paste form resin 18 is liable to be easily released from the metal cylinder 8. Then, the long length sheet to which the paste form resin 18 is fixed is released from the metal cylinder 8 with the releasing roll 11 and taken up by the take up shaft 20.

Figure 3:
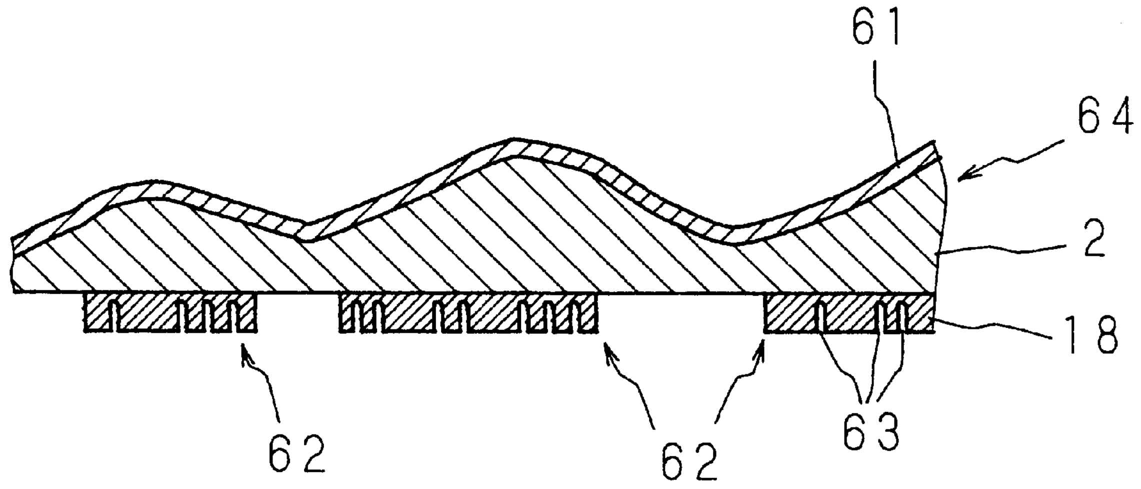
FIG. 3 is a sectional views showing a cavity included decorative sheet obtainable in Embodiment 1.

The resulting cavity included decorative sheet has, as shown in FIG. 3, the (second) uneven pattern 64 integrally formed with the long length base sheet 61 by the paste form resin 2 on one side of the base long length sheet 61, and the (first) uneven pattern 62 by the paste form resin 18, and water bubble-like cavities 63 formed in the uneven pattern 62 by the paste form resin 18, thus producing excellent design features.

The surface of the pressure roll 7 may be smooth. In such case, there is obtained a cavities included decorative sheet in which no uneven pattern 64 is formed but cavities 63 like a water bubble is formed in the uneven pattern 62.

Embodiment 2

The constitution may be such that, with the process for applying the paste form resin 2 omitted, the paste form resin 18 is directly applied to a long length sheet made of synthetic resin. In such a case, the constitution may be without being provided with a coating roll 3, receiving roll 4, and storage tank 1, or producing the cavity included decorative sheet may be performed without charging anything in the storage tank 1. Also, in this case, concave engraving pattern on the pressure roll 7 may not be provided.

Figure 4:
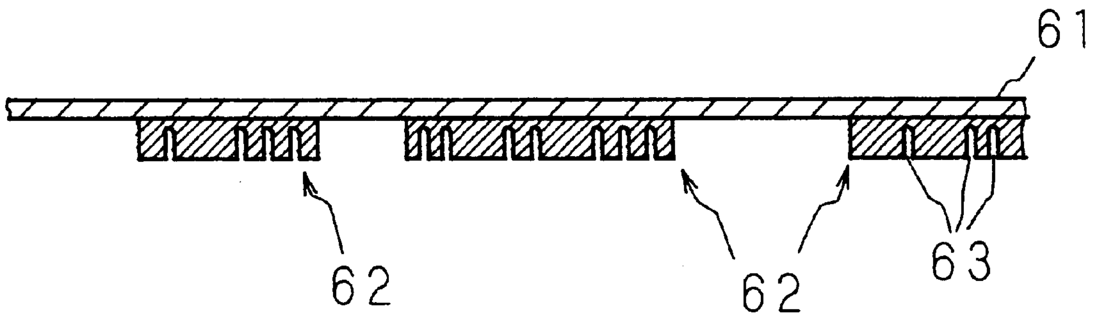
FIG. 4 is a sectional views showing a cavity included decorative sheet obtainable in Embodiment 2.

In this embodiment, as shown in FIG. 4, on only one side of the long length base sheet 61 an uneven pattern 62 is formed, in which there is formed cavities 63 which shows the appearance like water bubble.

Embodiment 3

Figure 5:
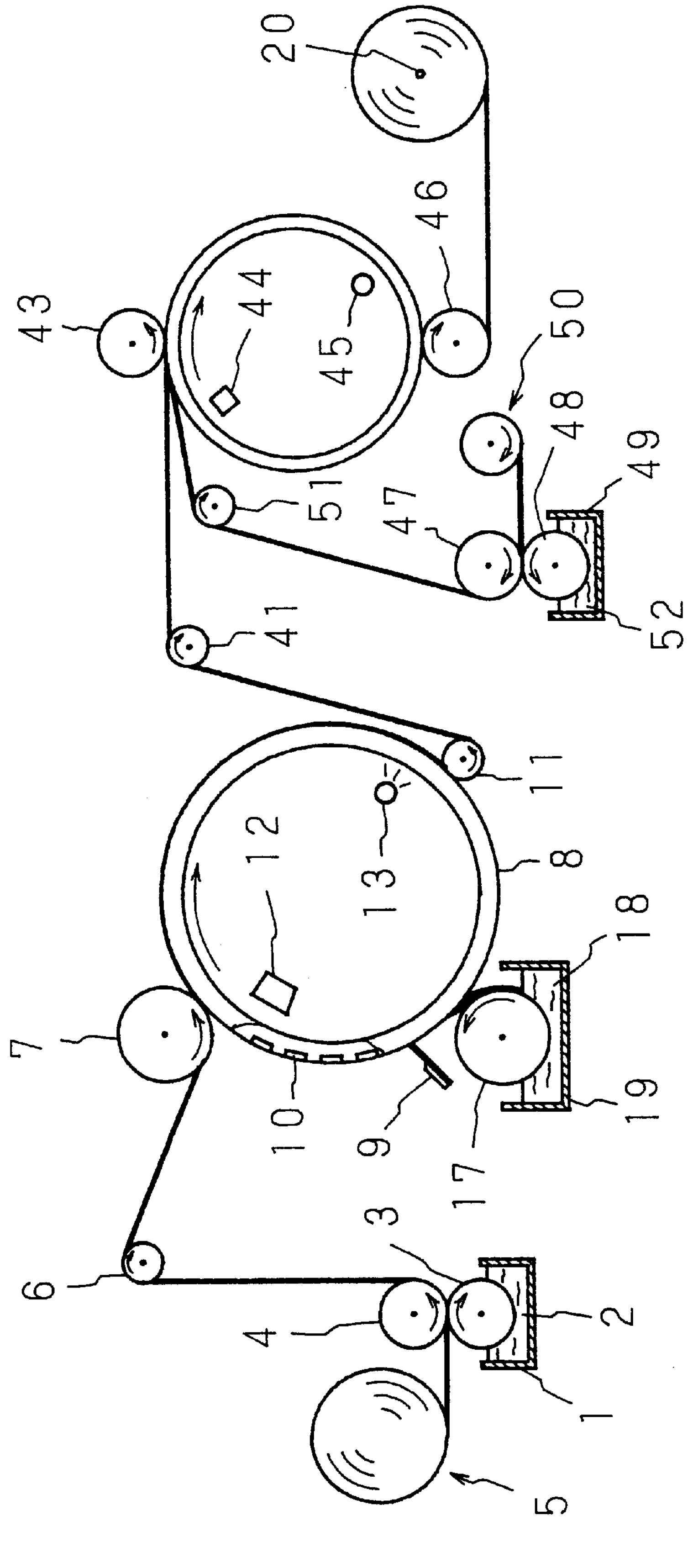
FIG. 5 is a schematic view showing an apparatus for manufacturing a cavity included decorative sheet according to Embodiment 3.

FIG. 5 is a schematic view showing a manufacturing apparatus for the cavity included decorative sheet according to Embodiment 3. In this embodiment, between the releasing roll 11 and the take up shaft 20 shown in FIG. 1, there is provided means for filling a third paste form resin in the cavities. Namely, a guide roll 41 for guiding the sheet released by the releasing roll 11 is provided right upper part of the releasing roll 11, and to the right of it a metal cylinder 42 whose outer surface is flat and a pressure roll 43 are provided. Inside the metal cylinder 42 there are a heater 44 and a cooler 45. To the right under the metal cylinder 42 there is a releasing roll 46 for releasing the sheet from the metal cylinder 42.

A drawing device 50 for drawing out another long length sheet of synthetic resin is disposed to the left side of the metal cylinder 42, and further to the left thereof a receiving roll 47 and coating roll 48 are provided. The lower half part of the coating roll 48 is made to be dipped in the third paste form resin 52 contained in a storage tank 49. On the position to be the underside of the long length sheet transmitted to the part between the metal cylinder 42 and the pressure roll 43 from the guide roll 41 there is a guide roll 51 for guiding the long length sheet from the drawing device 50 to the position between the metal cylinder 42 and the pressure roll 43.

In such an apparatus, the synthetic resin long length sheet having elasticity and light transmissibility wound in roll form on the drawing devices 5, 50 in advance is prepared. In the storage tank 1, the second paste form resin 2 is filled, in the storage tank 19, the first paste form resin 18 is stored, and in the storage tank 49, the third paste form resin 52 is stored. The second paste form resin 2, the first paste form resin 18, and the third paste form resin 52 may be of the same mixing and coloring, or different mixing and coloring.

When the long length sheet drawn out from the drawing device 50 is sent to the spot between the receiving roll 47 and the coating roll 48, the third paste form resin 52 is deposited through the coating roll 48 and transferred to the cavity between the metal cylinder 42 and the pressure roll 43 through the guide roll 51. On the other hand, in the same manner as above, the sheet released from the metal cylinder 8 is transferred to the position between the metal cylinder 42 and the pressure roll 43 via the guide roll 41.

Here, the cavities formed on the sheet released from the metal cylinder 8 and the third paste form resin 52 deposited on the sheet transferred through the guide roll 51 are placed in opposite relation and pressed by the pressure roll 43. Because the metal cylinder 42 on this position is heated by the heater 44, the third paste form resin 52 is softened and attached to the cavities in a manner to block them, and also adhered deposited to the surface part on which no cavity is formed. This sheet is cooled with the cooler 45, paste form resin 52 is solidified, and the sheet is released with the releasing roll 46 and taken up by the take up shaft 20.

Figure 6:
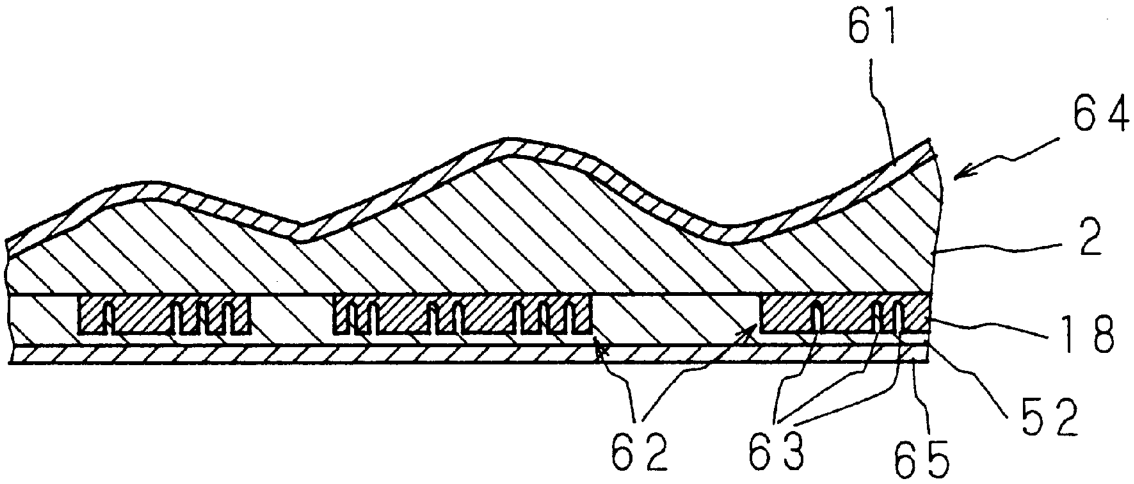
FIG. 6 is a sectional view showing a cavity included decorative sheet obtainable in Embodiment 3.

The resulting cavity included decorative sheet has, as shown in FIG. 6, the different uneven patterns 64, 62 formed by the paste form resins 2, 18 on one side of the long length base sheet 61, and in the uneven pattern 62 made by the paste form resin 18 there is formed cavities 63 like water bubble. Further, in a manner to cover the uneven pattern 62, a paste form resin 52 is applied, and further coated with the sheet 65 to give a cavity included decorative sheet having excellent design feature.

This embodiment may also be a constitution in which the second paste form resin 2 application process is omitted. Further, the surface of the pressure roll 7 may be smooth. It is also possible to save the process for applying the third paste form resin 52 and, with a viscous sheet provided on the drawing device 50, to bond the viscous sheet to the bubble side.

Furthermore, the surface of the coating roll 48 can be smooth or uneven shape, according to necessity. In case of the smooth surface, the third paste form resin 52 is uniformly applied to the long length sheet drawn out from the drawing device 50. In case the surface is engraved in concave form for intaglio, the paste form resin 52 is applied according to the engraved shape. Further, in case the surface is formed in embossed style for relief printing, the paste form resin 52 is applied according to the shape of convex embossing.

The constitution elements of each means in each embodiment and the disposition thereof are not limited to those illustrated.

Example 1

The apparatus as shown in FIG. 1 is used. On the surface of the metal cylinder 8 the predetermined pattern is formed by concave engraving parts 10, and at the bottom surface of the concave engraving part 10 there are provided the different sized approximately pillar shaped projections **10*a* at random. On the surface of the pressure roll 7, predetermined uneven pattern is formed. For the second and first paste form resins 2, 18 a colorless, transparent polyvinyl chloride paste sol having the following mixture is used. For the drawing device 5**, a sheet of colorless, transparent synthetic resin printed with a stained glass tone pattern previously is set. On the reverse surface of the resulting sheet a viscous layer is provided by known technique.

(Mixing example)

| | |
|---|---|
| R-890 made by Tosoh Corporation | 100 parts |
| DOP made by Sekisui Chemical Co., Ltd | 48 parts |
| BZ-100CJ by Katsuda kako Co., Ltd | 2.5 parts |
| ABC-18J by Katsuda kako Co., Ltd | 0.5 part |

Figure 7:
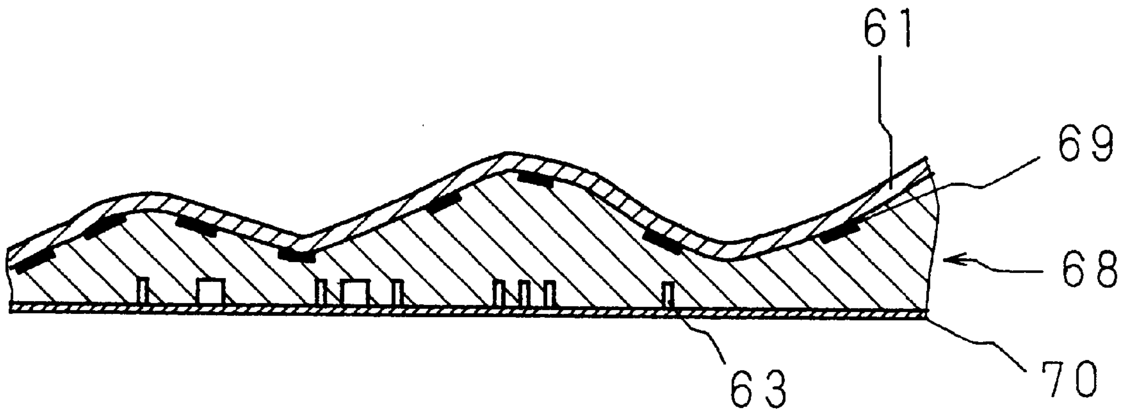
FIG. 7 is a sectional view showing a cavity included decorative sheet obtainable in Example 1.

FIG. 7 is a sectional view of a resulting cavity included decorative sheet. It has a stained glass tone pattern formed by a printed layer 69, in which the light is diffracted by uneven pattern 68 and stereographic showing is emphasized, and yet the inside cavities 63 shine as if glass beads are scattered, and the sheet has an adhesive layer 70 on the reverse side. Thus, gorgeous elastic window labeling sheet is obtained. On application of this sheet to the window, refraction of light from outside shows variation depending on the viewing angle. Abundant decorative feature is given.

Example 2

The apparatus as shown in FIG. 1 is used. On the surface of the metal cylinder 8 having the width of 1800 mm, 15 mm wide curved concave engraved parts 10 are provided at 30 mm pitch. On the bottom face of the concave engraved part 10 approximately pillar shaped fire projections 10*a* are densely gathered in star shape and also provided in scattering around them. The surface of the pressure roll 7 is smooth. For the second and first paste form resins 2, 18, a blue colored transparent polyvinyl chloride paste sol made by adding a blue coloring agent to the mixture as described in Example 1 is used, and for the drawing device 5 a colorless transparent synthetic resin sheet is provided.

Figure 8:
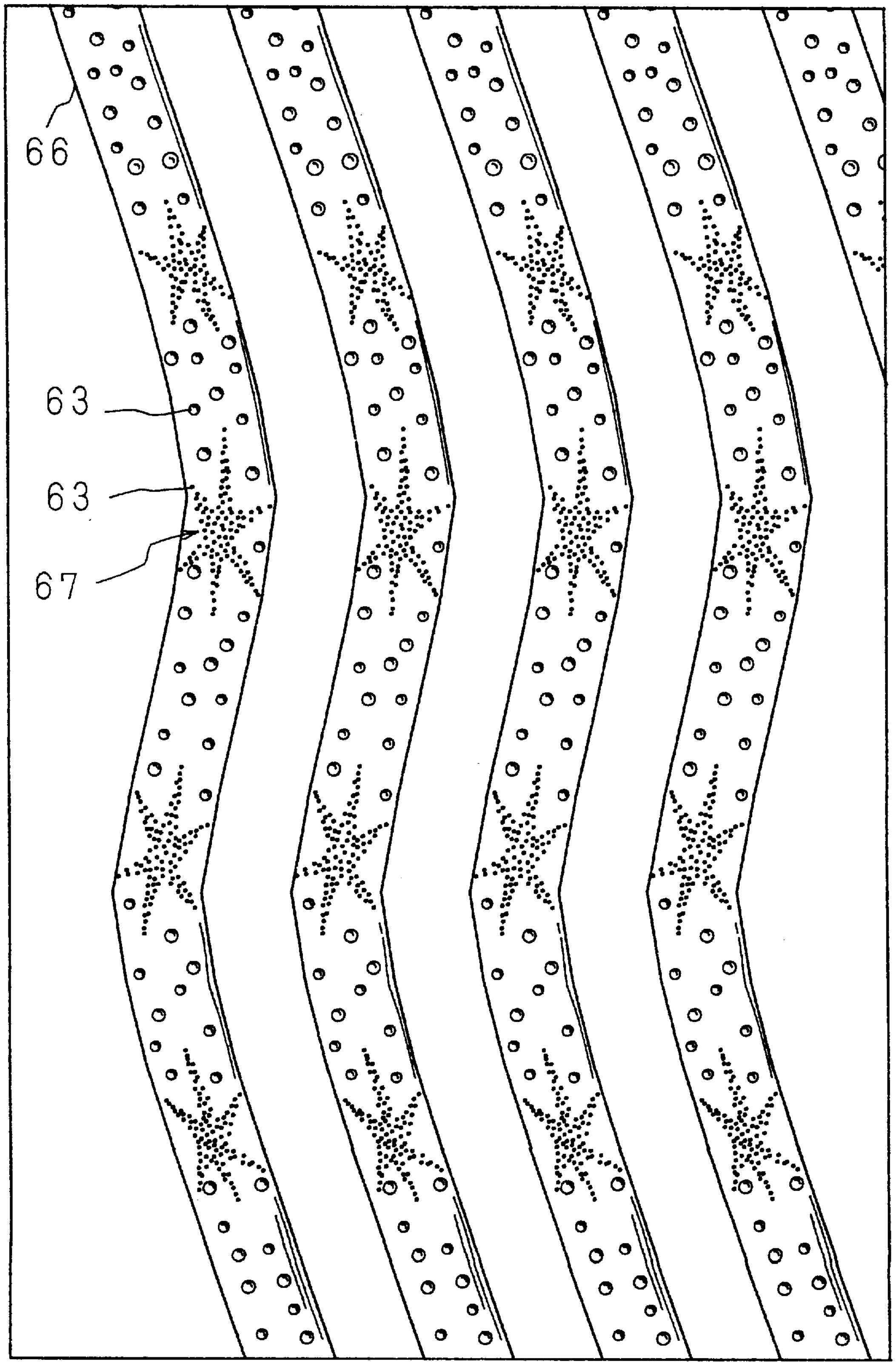
FIG. 8 is a plan view showing a cavity included decorative sheet obtainable in Example 2.

By the above contrivance, as shown in FIG. 8, there is obtained an excellent cavity included decorative sheet in which the star shaped pattern 67 is formed with cavities 63 in a curved convex curve pattern 66, so that the light refracts and reflects in complicated directions in the above cavities 63 to give a cavity included decorative sheet having excellent design features.

Example 3

The apparatus as shown in FIG. 5 is used. On the surface of the metal cylinder 8, a pattern descriptive of aquatics of fishes and crabs and the like is formed by concave engraved parts 10, with the projections 10*a* being provided so as to show gradual lowering of density from the portions corresponding to the mouth of fish or crab toward the central part. The surface of the pressure roller 7 is made smooth. For the second and first paste form resins 2, 18, a colorless transparent polyvinyl chloride paste sol of the mixture as described in Example 1 is used, and for the drawing device 5 a colorless transparent synthetic resin sheet is provided. For the third paste form resin 52, a blue colored transparent polyvinyl chloride paste sol is used, and for the drawing device 50 a white colored synthetic resin sheet is provided. Further, the coating roll 48 is provided with convex formation of seaweed pattern so that a blue colored seaweed pattern is printed on the white colored synthetic resin sheet in the process of application of the third paste form resin 52. The resulting sheet is cut into a size of for example 30 cm×45 cm.

Figure 9:
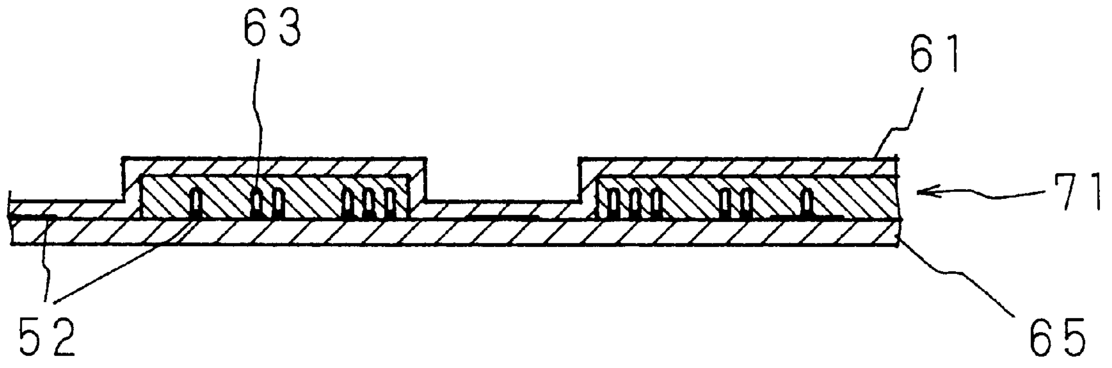
FIG. 9 is a sectional view showing a cavity included decorative sheet obtainable in Example 3.

FIG. 9 is a sectional view of the thus obtained cavity included decorative sheet. An uneven pattern 71 of fish and crab by the paste form resins 2, 18 is formed, in which cavities 63 are formed. Further, a blue seaweed design is formed with paste form resin 52. As a result, there is obtained a luncheon mat having designs of transparent fish and crab swimming while breathing shining bubbles, with said bubbles shining in blue color on the zone overlapping the seaweed pattern.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. A decorative household article comprising:

a base sheet having light transmissibility;

a first uneven pattern provided on one side of said base sheet, said first uneven pattern being a raised area of a first colored or colorless translucent resin adhered to said one side of said base sheet and having surface cavities formed therein.

2. A decorative household article according to claim 1, wherein a second uneven pattern is provided on said base sheet, said second uneven pattern having concave portions and being formed of a second colored or colorless translucent resin, and said first uneven pattern being provided on said second uneven pattern.

3. A decorative household article according to claim 1, wherein said cavities are closed with a third colored resin having a color different from that of said first uneven pattern.

4. A decorative household article according to claim 1, wherein one surface of said sheet is essentially flat and is coated with a transparent adhesive.

5. A decorative household article according to claim 1, wherein a colored print sheet is adhered to either side.

6. A decorative household article according to claim 2, wherein said first uneven pattern and said second uneven pattern have different colors.

7. A decorative household article according to claim 2, wherein said cavities are closed with a third colored resin having a color different from that of said first uneven pattern.

8. A decorative household article according to claim 2, wherein a colored print sheet is adhered to either side.

9. A decorative bousehold article according to claim 1, wherein said first colored or colorless translucent resin and said second colored or colorless translucent resin have the same composition.

10. A decorative household article according to claim 2, wherein said first colored or colorless translucent resin and said second colored or colorless translucent resin have the same composition.

11. A decorative household article according to claim 1, wherein a surface of said base sheet is colored with a color different from that of the first uneven pattern.

12. A decorative household article according to claim 2, wherein a surface of said base sheet is colored with a color different from that of the first uneven pattern.

* * * * *